(12) United States Patent
Vidrine

(10) Patent No.: US 12,089,538 B1
(45) Date of Patent: Sep. 17, 2024

(54) VIBRATORY ATTACHMENT FOR A GRAIN AUGER

(71) Applicant: Ryan Vidrine, Washington, LA (US)

(72) Inventor: Ryan Vidrine, Washington, LA (US)

( * ) Notice: Subject to any disclaimer, the term of this patent is extended or adjusted under 35 U.S.C. 154(b) by 211 days.

(21) Appl. No.: 17/751,866

(22) Filed: May 24, 2022

(51) Int. Cl.
  *A01F 25/20* (2006.01)
  *B65D 88/66* (2006.01)

(52) U.S. Cl.
  CPC .......... *A01F 25/2018* (2013.01); *B65D 88/66* (2013.01)

(58) Field of Classification Search
  CPC ............................ A01F 25/2018; B65D 88/66
  See application file for complete search history.

(56) References Cited

U.S. PATENT DOCUMENTS

| | | | | |
|---|---|---|---|---|
| 3,501,029 A * | 3/1970 | Weaver | ............... | A01F 25/2018 414/311 |
| RE26,863 E * | 4/1970 | Weaver | ............... | B65G 65/466 414/311 |
| 3,648,860 A * | 3/1972 | Wennberg | ........... | A01F 25/2018 414/310 |
| 3,724,819 A | 4/1973 | Varnum et al. | | |
| 4,207,005 A | 6/1980 | Stanfield | | |
| 4,451,192 A * | 5/1984 | Wood | ................... | B65G 65/425 198/550.4 |
| 4,669,941 A * | 6/1987 | West | ................... | B65G 65/466 414/310 |
| 5,513,597 A | 5/1996 | Pollock | | |
| 5,697,327 A | 12/1997 | Pollock | | |
| 6,591,780 B2 | 7/2003 | Fujii | | |
| 9,033,639 B2 | 5/2015 | Schoenfeld et al. | | |
| 9,469,472 B2 | 10/2016 | Anderson | | |
| 9,617,067 B2 | 4/2017 | Anderson | | |
| 9,902,575 B1 * | 2/2018 | Mack | ................. | B65G 65/4836 |
| 9,963,293 B2 * | 5/2018 | Pleima | ................... | B65D 88/66 |

* cited by examiner

*Primary Examiner* — Jonathan Snelting
(74) *Attorney, Agent, or Firm* — Cramer Patent & Design PLLC; Aaron R. Cramer

(57) ABSTRACT

The vibratory attachment for a grain auger is a system and method to aid in the removal of grain from a silo via an auger. In addition to the housing that contains the auger at the bottom of a bin, a specialized angled metal plate is welded to the housing at the interior end. A pneumatic turbine vibrator is then mounted to this plate. When the vibrator is powered by a compressed air source, the vibrations travel down the length of the auger housing which is in contact with the compacted grain. The vibrations then break down any "bridging" that occurs in the grain around the auger, thus allowing the grain to fall freely and be removed by the auger in a normal manner. It is envisioned that operation of the vibrator would occur manually when needed or be triggered on a recurring basis by a timing system.

20 Claims, 4 Drawing Sheets

VIBRATORY ATTACHMENT FOR A GRAIN AUGER

RELATED APPLICATIONS

None.

FIELD OF THE INVENTION

The present invention relates to a vibratory attachment and more specifically to a vibratory attachment for a grain auger.

BACKGROUND OF THE INVENTION

Product harvested by farmers all over the world include corn, soybeans, wheat, rice, rye, oats and the like. As such grains finish their growing cycle, they are harvested and stored in bins and silos until they can be processed. During removal of the grain from the storage bin or silo, an auger is often used. The screw-like construction of the auger allows grain to be quickly and easily moved down the length of the screw.

However, in large bins, silos, or hoppers, the weight of the grain above leads to "bridging" of the grain at the bottom where it simply is locked into place and will not fall into the auger screws. This poses a dilemma as workers cannot enter the storage area without a large amount of safety equipment, other workers, and a regimented safety program in place. Accordingly, there exists a need for a means by which bridged gain in a storage facility can be easily avoided. The development of the vibratory attachment for a grain auger fulfills this need.

SUMMARY OF THE INVENTION

The principles of the present invention provide for a vibratory device that has a floor sweep auger adapted to be positioned along a circumference of a grain silo exterior wall near an access opening, an access hole disposed near the access opening, a pneumatic turbine vibrator located atop the floor sweep auger, a single center well and one or more intermediate wells adapted to be disposed on a floor of a silo, and a flat plate directing a plurality of grain into the floor sweep auger and to the single center well and the intermediate wells and away from a drive motor. The floor sweep auger having an interior auger end and an exterior auger, and a screw-style auger powered by a drive means. The screw-style auger is contained within the floor sweep auger the floor sweep auger is arranged in a linear configuration over the floor of the silo.

The floor sweep auger may have a drive motor which may be in mechanical communication with and may provide rotational power to the screw-style auger via the drive means. The drive means may be selected from the group consisting of a belt and pulley connection, a chain drive, a direct drive, or a gear drive. The floor sweep auger may be in close proximity to the drive means, but the floor sweep auger may not contact the grain silo exterior wall near the access opening. The floor sweep auger may be one half of a diameter of the silo. The access opening may be a door. The access opening may be a hatch. The exterior auger end may be adapted to be disposed near the grain silo exterior wall at the access opening. The floor sweep auger may be near an interior of the pneumatic turbine vibrator. The floor sweep auger may be near a center mounted portion of the pneumatic turbine vibrator. The pneumatic turbine vibrator may be disposed on the floor sweep auger where it may be held in place by a plurality of mechanical fasteners. The mechanical fasteners may be a plurality of bolts. The pneumatic turbine vibrator may be positioned near the flat plate atop the floor sweep auger. The pneumatic turbine vibrator may be pressurized and may produce vibrations throughout the floor sweep auger and the screw-style auger to avoid blockages and prevent bridging of the grain, thus allowing the grain to fall freely and be removed by the floor sweep auger. The interior auger end may be disposed near the center well. The single center well and the intermediate wells may be positioned below the silo floor where they may be in physical communication with a discharge chute. The drive motor may be connected to a drive bearing via the drive means, which in turn may drive the screw style auger. The flat plate may be made of steel. The vibratory device may further comprise a first air hose connected between the pneumatic turbine vibrator and a female air coupler. The vibratory device may further comprise a second air hose, provided with a male air coupler, routed through the access hole of the grain silo exterior wall, where it may connect to a suitable source of compressed air.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
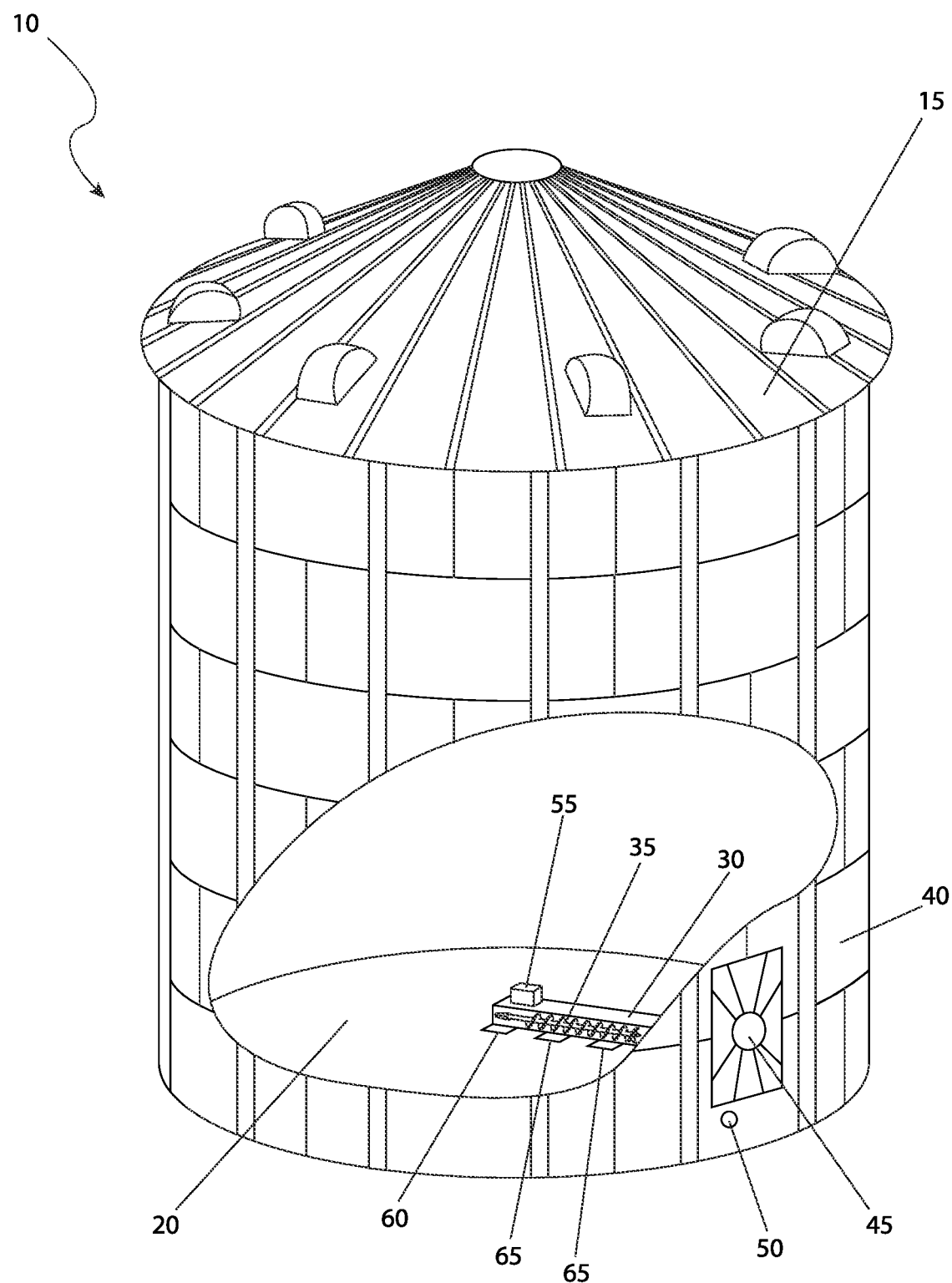
FIG. 1 is a pictorial cutaway view of the vibratory device, shown in an installed state in a grain silo, according to the preferred embodiment of the present invention.

10 vibratory device
15 grain silo
20 silo floor
30 floor sweep auger
35 screw-style auger
40 grain silo exterior wall
45 access opening
50 access hole
55 pneumatic turbine vibrator
60 center well
65 intermediate well
70 interior auger end
75 exterior auger end
80 discharge chute
85 drive motor
90 drive means
95 flat plate
100 drive bearing
105 first air hose
110 female air coupler
115 second air hose
120 male air coupler

DESCRIPTION OF THE PREFERRED EMBODIMENTS

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a pictorial cutaway view of the vibratory device 10, shown in an installed state in a grain silo 15, according to the preferred embodiment of the present invention is disclosed. The vibratory device (herein also described as the "device") 10, provides an aid for the removal of grain from a silo 15 via an auger 30, 35. The grain silo 15 is equipped with a silo floor 20 as typically expected, along with multiple wells 60, 65 for collection and ultimate egress of stored grain. The bottom of the grain silo 15 is provided with a floor sweep auger 30 and a screw-style auger 35. The distal end of the floor sweep auger 30, along the circumference of the grain silo exterior wall 40 is positioned near an access opening 45 such as a door or hatch. An access hole 50 is preferably located near the access opening 45. However, the exact location of the access hole 50 is not intended to be a limiting factor of the present invention. Further detail on the utilization of the access hole 50 will be provided herein below. Finally, a pneumatic turbine vibrator 55 is located atop the floor sweep auger 30 near the interior or center mounted portion. The pneumatic turbine vibrator 55 is envisioned to be a Vibco Model BVS-510—Pneumatic Turbine Vibrator or similar assembly.

Figure 2:
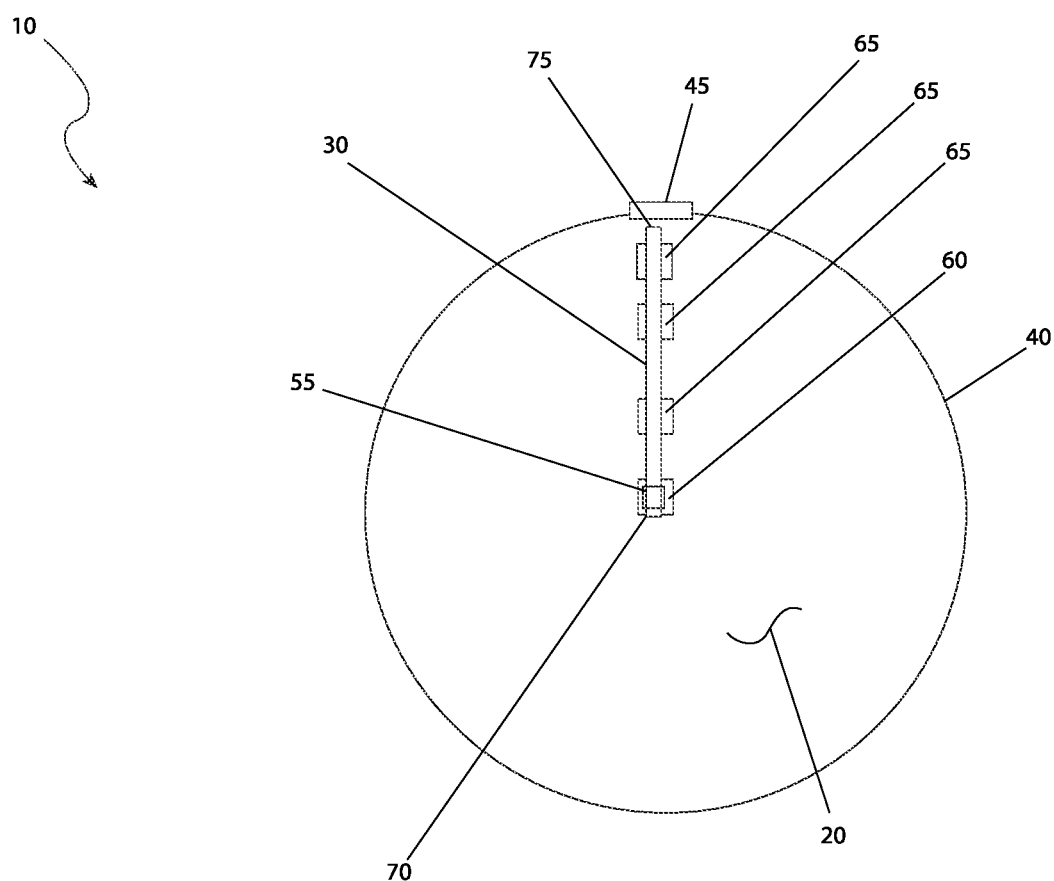
FIG. 2 is a top view of the vibratory device, according to the preferred embodiment of the present invention.

Referring next to FIG. 2, a top view of the device 10, according to the preferred embodiment of the present invention is depicted. This view of FIG. 2 provides additional clarification on the configuration of the device 10 within the grain silo exterior wall 40 and upon the silo floor 20. The silo floor 20 is provided with a single center well 60 and one (1) or more intermediate wells 65 with the floor sweep auger 30 arranged in a linear configuration over the top. The interior auger end 70 is positioned near the center well 60 while the exterior auger end 75 is positioned near the grain silo exterior wall 40 at the access opening 45. The overall length of the floor sweep auger 30 will vary per the size of the grain silo 15 (as shown in FIG. 1) and is generally one half (½) of the diameter of a circular grain silo 15. It is noted that the teachings of the device 10 may also be applied to other shapes of grain silo 15, provided that a floor sweep auger 30 is utilized. The pneumatic turbine vibrator 55 is positioned on the floor sweep auger 30 where it is held in place by mechanical fasteners such as bolts.

Figure 3:
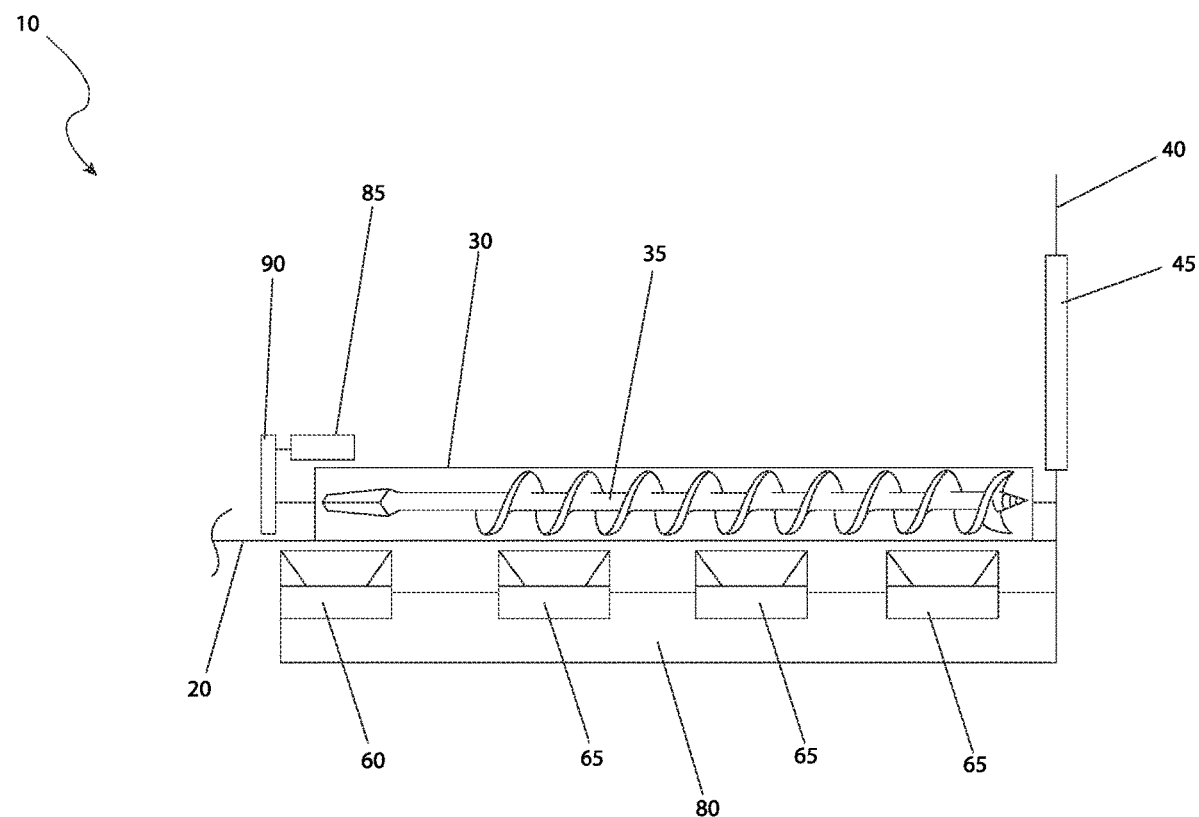
FIG. 3 is a front view of the vibratory device, according to the preferred embodiment of the present invention.

Referring now to FIG. 3, a front view of the device 10, according to the preferred embodiment of the present invention is shown. The center well 60 and the intermediate wells 65 are positioned below the silo floor 20 where they are in physical communication with a discharge chute 80 in a typical fashion. The floor sweep auger 30 is provided with a drive motor 85 which is mechanical communication and provides rotational power to the screw-style auger 35 via a drive means 90 such as belt and pulley connection. Other methods of drive means 90 including but not limited to: chain drive, direct drive, gear drive and the like may also be utilized with the teachings of the device 10. The drive means 90 subsequently powers the screw-style auger 35 contained within the floor sweep auger 30. The floor sweep auger 30 is in close proximity, but does not contact the grain silo exterior wall 40 near the access opening 45.

Figure 4:
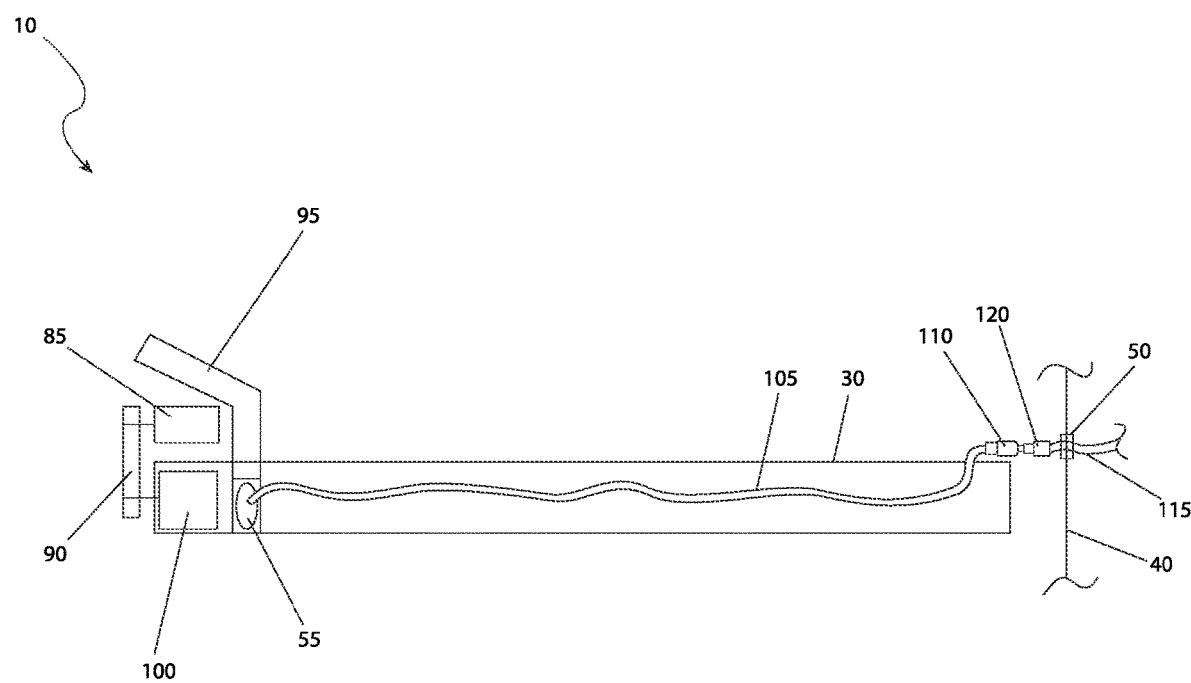
FIG. 4 is a rear view of the vibratory device, according to the preferred embodiment of the present invention.

Referring to FIG. 4, a rear view of the vibratory device for floor sweep silo auger 10, according to the preferred embodiment of the present invention is disclosed. A flat plate 95, envisioned to be made of steel, aids in directing grain into the floor sweep auger 30 and subsequently the center well 60 and the intermediate well(s) 65, (both of which are shown in FIGS. 2 AND 3) and away from the drive motor 85. The drive motor 85 is connected to a drive bearing 100, via the drive means 90, which in turn drives the screw style auger 35 (as shown in FIG. 1). The pneumatic turbine vibrator 55 is positioned near the flat plate 95 atop the floor sweep auger 30. A first air hose 105 is connected between the pneumatic turbine vibrator 55 and a female air coupler 110. A second air hose 115, provided with a male air coupler 120, is routed through the access hole 50, of the grain silo exterior wall 40, where it connects to a suitable source of compressed air. When pressurized, the pneumatic turbine vibrator 55 produces vibrations throughout the floor sweep auger 30 and the screw-style auger 35 to avoid blockages and prevent bridging of the grain, thus allowing the grain to fall freely and be removed by the floor sweep auger 30 in a normal manner. It is envisioned that operation of the device 10 would occur manually when needed or be triggered on a recurring basis by a timing system.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 4. The user would procure the device 10 from conventional procurement channels such as agricultural supply houses, farm supply retailers, mechanical equipment retailers, mail order and internet supply houses and the like. It is envisioned that the teachings of the device 10 would be provided as standard or optional equipment on floor sweep auger 30, or could be made available as an add-on kit for an existing floor sweep auger 30.

After procurement and prior to utilization, the device 10 would be prepared in the following manner: in the case of an add on kit, the pneumatic turbine vibrator 55 would be positioned near the interior auger end 70 of the floor sweep auger 30 and over the center well 60; the pneumatic turbine vibrator 55 would then be mechanically coupled to the floor sweep auger 30 using fasteners such as bolts. It is noted that the exact method of fastening is not intended to be a limiting factor of the present invention. A first air hose 105 is then routed between the pneumatic turbine vibrator 55 and a female air coupler 110 at the exterior auger end 75 of the floor sweep auger 30; and, a second air hose 115 with a male air coupler 120 is then routed through the access hole 50 in the grain silo exterior wall 40 and connected to a suitable and controlled source of compressed air.

During unloading operations of the grain silo 15, should the flow of grain be stopped or greatly diminished, the source of compressed air would be activated resulting in the operation of the pneumatic turbine vibrator 55. Resultant vibrations would pass through the floor sweep auger 30 and the screw-style auger 35 to prevent blockages and prevent bridging of the grain, thus allowing the grain to fall freely and be removed by the floor sweep auger 30 in a normal manner. The pneumatic turbine vibrator 55 may be left operational as long as needed.

After use of the device 10, the source of compressed air is removed, ceasing operation of the device 10. The device 10 would be left in place for future operation on an as-needed basis in a cyclical manner.

The features of the device 10 are envisioned to produce the following benefits over current grain unloading methods: the device 10 is simple to install; is durable and dependable, is easy to use, is maintenance free, is safe to use for the operator, the floor sweep auger 30 and the grain, and saves time and money in grain unloading operations.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A vibratory device, comprising:
   a floor sweep auger adapted to be positioned along a circumference of a grain silo exterior wall near an access opening, the floor sweep auger having an interior auger end and an exterior auger end;
   a screw-style auger powered by a drive means, the screw-style auger is contained within the floor sweep auger;
   an access hole disposed near the access opening;
   a pneumatic turbine vibrator located atop the floor sweep auger;
   a single center well and one or more intermediate wells adapted to be disposed on a floor of a silo, the floor sweep auger is arranged in a linear configuration over the floor of the silo; and
   a flat plate directing a plurality of grain into the floor sweep auger and to the single center well and the intermediate wells and away from a drive motor.

2. The vibratory device, according to claim 1, wherein the floor sweep auger having the drive motor which is in mechanical communication with and provides rotational power to the screw-style auger via the drive means.

3. The vibratory device, according to claim 1, wherein the drive means is selected from the group consisting of a belt and pulley connection, a chain drive, a direct drive, or a gear drive.

4. The vibratory device, according to claim 3, wherein the floor sweep auger is adjacent the drive means, but the floor sweep auger does not contact the grain silo exterior wall near the access opening.

5. The vibratory device, according to claim 1, wherein the floor sweep auger is one half of a diameter of the silo.

6. The vibratory device, according to claim 1, wherein the access opening is a door.

7. The vibratory device, according to claim 1, wherein the access opening is a hatch.

8. The vibratory device, according to claim 1, wherein the exterior auger end is adapted to be disposed near the grain silo exterior wall at the access opening.

9. The vibratory device, according to claim 1, wherein the floor sweep auger is near an interior of the pneumatic turbine vibrator.

10. The vibratory device, according to claim 1, wherein the floor sweep auger is near a center mounted portion of the pneumatic turbine vibrator.

11. The vibratory device, according to claim 1, wherein the pneumatic turbine vibrator is disposed on the floor sweep auger where the pneumatic turbine vibrator is held in place by a plurality of mechanical fasteners.

12. The vibratory device, according to claim 11, wherein the mechanical fasteners are a plurality of bolts.

13. The vibratory device, according to claim 1, wherein the pneumatic turbine vibrator is positioned near the flat plate atop the floor sweep auger.

14. The vibratory device, according to claim 1, wherein the pneumatic turbine vibrator is pressurized and produces vibrations throughout the floor sweep auger and the screw-style auger to avoid blockages and prevent bridging of the grain, thus allowing the grain to fall freely and be removed by the floor sweep auger.

15. The vibratory device, according to claim 1, wherein the interior auger end is disposed near the center well.

16. The vibratory device, according to claim 1, wherein the single center well and the intermediate wells are positioned below the silo floor where the single center well and the intermediate wells are in physical communication with a discharge chute.

17. The vibratory device, according to claim 1, wherein the drive motor is connected to a drive bearing via the drive means, the drive means in turn drives the screw style auger.

18. The vibratory device, according to claim 1, wherein the flat plate is made of steel.

19. The vibratory device, according to claim 1, further comprising a first air hose connected between the pneumatic turbine vibrator and a female air coupler.

20. The vibratory device, according to claim 1, further comprising a second air hose, provided with a male air coupler, routed through the access hole of the grain silo exterior wall, where the second air hose connects to a suitable source of compressed air.

* * * * *